J. B. BRENNAN.
METHOD OF MAKING SHEET STOCK FOR PNEUMATIC TIRES.
APPLICATION FILED DEC. 20, 1917.

1,317,426.

Patented Sept. 30, 1919.
2 SHEETS—SHEET 1.

INVENTOR:
Joseph B. Brennan
by Macleod, Calver, Copeland & Dike
Attys.

UNITED STATES PATENT OFFICE.

JOSEPH B. BRENNAN, OF AKRON, OHIO.

METHOD OF MAKING SHEET-STOCK FOR PNEUMATIC TIRES.

1,317,426.

Specification of Letters Patent. Patented Sept. 30, 1919.

Application filed December 20, 1917. Serial No. 208,043.

*To all whom it may concern:*

Be it known that I, JOSEPH B. BRENNAN, a citizen of the United States, residing at Akron, county of Summit, State of Ohio, have invented a certain new and useful Improvement in Methods of Making Sheet Stock for Pneumatic Tires, of which the following is a specification, reference being had therein to the accompanying drawings.

My invention has for its object a new and improved method of making sheet stock for use in the manufacture of pneumatic tires of the type ordinarily known as cord tires. Heretofore in the manufacture of so-called cord tires and in accordance with one well known method of manufacture, it has been customary to make up sheets of fabric composed of cords of small diameter held together into a fabric by thin tenuous warp threads. This sheet is impregnated with a solution of rubber in benzin and carbon tetrachlorid as a solvent, and is then cut into strips of suitable length and built into the tire in such a way that the cords lie diagonally of the threads of the tire the tenuous warp threads being at right angles with the cords and being broken when the material is built into the tire. The presence of the said warp threads is objectionable both on account of the expense and because they produce points of friction with the cords which affects the life of the tire. Another objection to this method is that the fabric thus produced can be frictioned successfully only by dipping it in a rubber solution because the fabric is too frail to permit calendering. As is well known to those skilled in the art, rubber solution will not produce as durable a result as can be obtained where undissolved rubber in its normal dry state is employed.

Another well known method of constructing cord tires is by laying successively across the tread in a diagonal position cords of large diameter, successive layers of the cords being at substantially right angles to each other. This method is objectionable because it necessitates the use of a great number of extremely complicated machines which work relatively slowly.

The particular object of my invention is to produce a cord sheet material for use in the manufacture of pneumatic tires of the first type heretofore described without the use of the said warp threads and in which undissolved rubber in its normal dry state may be employed as the frictioning material so that a tire having maximum durability can be produced at an expense very much below that resulting from the manufacture of cord tires by either of the methods hereinbefore mentioned.

My improved method consists essentially in feeding a series of cords through a tube forming member or nozzle by means of which the cords are arranged to form a tube but are not interwoven and are preferably parallel with each other and with the axis of the tube, and preferably as the cords pass through the nozzle coating or frictioning the cords with undissolved rubber in its normal dry state. The cords are held together in the tube by the frictioning material. The tube thus formed is then slit or cut so that it may be opened to form a strip of the desired width and wound onto the roll. In the preferred embodiment of my invention, I cut the tube along a spiral line at an angle of substantially 45° to the line of the cords in the tube and by so doing form a strip, the cords composing which lie on the bias, that is, on an angle of about 45°. In a modified form of the process the cords are wound on a mandrel spirally and the tube which is thus formed is slit lengthwise of the mandrel, the line of the slit being at substantially 45° to the line of the cords in the tube. This is however only a specific form of the general method forming my invention. The results of the herein described process is a strip of sheet material composed of cords not interwoven with each other and held together by vulcanizable frictioning material. In the preferred form, cords are at 45° to the length of the strip, being on the bias.

The invention will be fully understood by reference to the following description, when taken in connection with the accompanying drawings and the novel features thereof will be pointed out and clearly defined in the claims at the close of this specification.

In the drawings Figure 1 is a plan view of a portion of the strip of sheet material made in accordance with the hereindescribed method.

Figure 1:
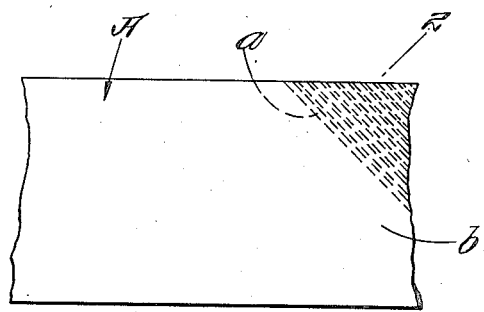
Figure 2:
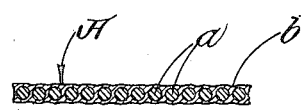
Fig. 2 is a section much enlarged taken on line 2—2 of Fig. 1.

Having reference now to the drawings and particularly to Figs. 1 and 2 there is shown therein a portion of a strip of sheet material A composed of a series of parallel cord $a$ embedded in a vulcanizable material $b$ preferably rubber in its normal dry state. In the form shown in the drawings which is my preferred form, the cords are at an angle of substantially 45° to the length of the strip, that is, they are on the bias. It will be noticed that the cords are not interwoven being held together by the frictioning material and that their ends are severed along the edge of the strip.

Figure 3:
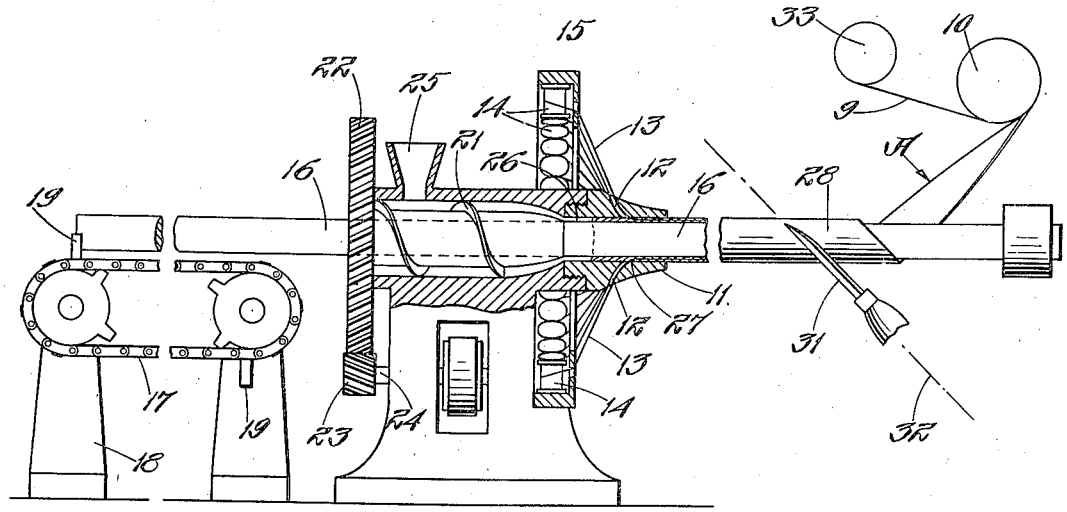
Fig. 3 is a side elevation partly in section of the devices employed in practising the method embodying my invention.

In Fig. 3, there is shown a machine by which the novel method embodying my invention is practised in the manufacture of sheet material shown in Figs. 1 and 2. At 11 is shown a tube forming nozzle having therein a series of passages or apertures 12 through which cords 13 may be fed. The cords 13 are wound on spools or bobbins 14 carried in a stationary frame 15. At 16 is shown a sliding mandrel located in the said nozzle and adapted to be slid lengthwise therein in any suitable manner either by hand or by mechanism for the purpose. In the drawings, I have shown an endless carrier 17 supported on a suitable frame 18 and provided with fingers 19 one of which contacts with the end of the mandrel and pushes it into the tube forming nozzle. It will be understood that when the mandrel has reached a certain point another mandrel will be put in place with its front end against the back end of the first mandrel and in this way the first mandrel will be pushed through the machine. At 21 is shown the screw of a stuffing machine rotated by the gears 22, 23 driven from the shaft 24 which is connected to any suitable source of power. At 25 is shown a hopper through which the frictioning material which is preferably undissolved rubber in its normal dry state is introduced into the stuffing machine. The screw 21 forces the frictioning material through the space 26 between the mandrel 16 and the interior of the tube forming nozzle 11 filling the said space as the mandrel advances. When the frictioning reaches the point 27, it meets the cords 13 and surrounds and thoroughly coats them and fills the interstices between them. The movement of the mandrel 16 forward and the pressure of the frictioning material produced by the screw 21 together with the tendency of the tube 28 to shrink on the mandrel 16 serve to pull the cords 13 through the tube forming nozzle 11. In this manner a tube is formed on the exterior of the nozzle. This tube is composed of cords lying lengthwise of the mandrel and the said cords will be held together in the form of a tube by the frictioning material. The tube is next slit or cut along a line at an angle of about 45° with the line of the cords. Where the cords lie parallel with the axis of the mandrel as in the form just described, the line of the cut will be spiral. In the drawings, I have shown a knife 31 and have indicated the line of cut by a dotted line 32. The strip of stock is then opened and wound on a roll 10, there being interposed between the layers of stock a strip of muslin 9 from a roll 33 in the manner well understood by those skilled in the art.

Figure 4:
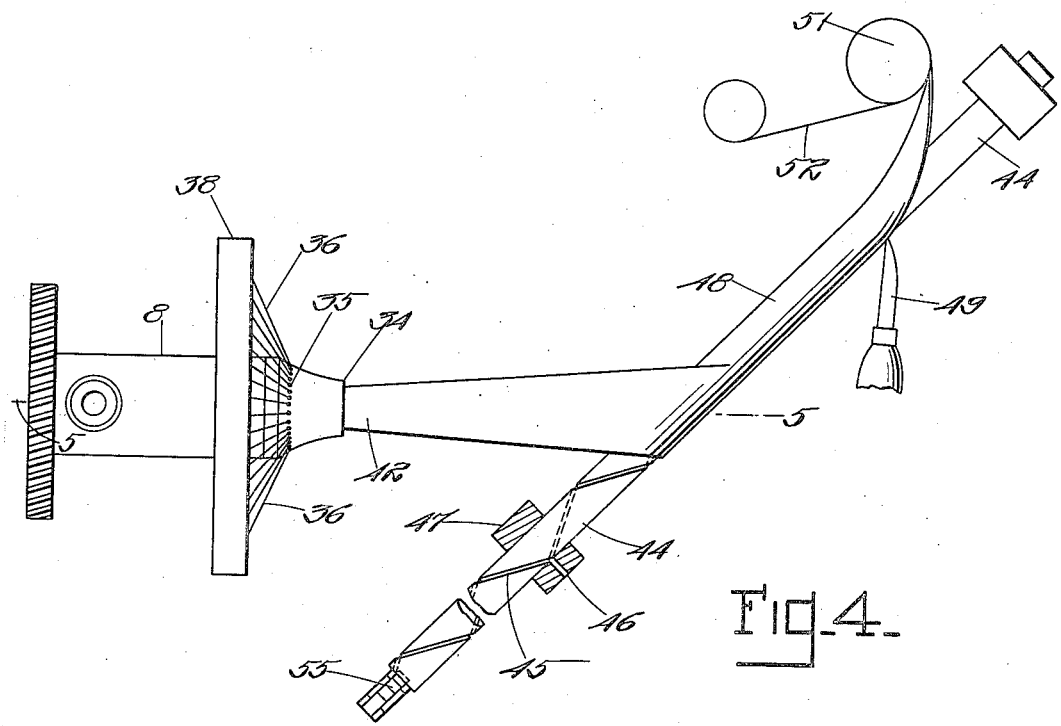
Fig. 4 is a plan view of the devices employed in practising the modified method described herein.
Figure 5:
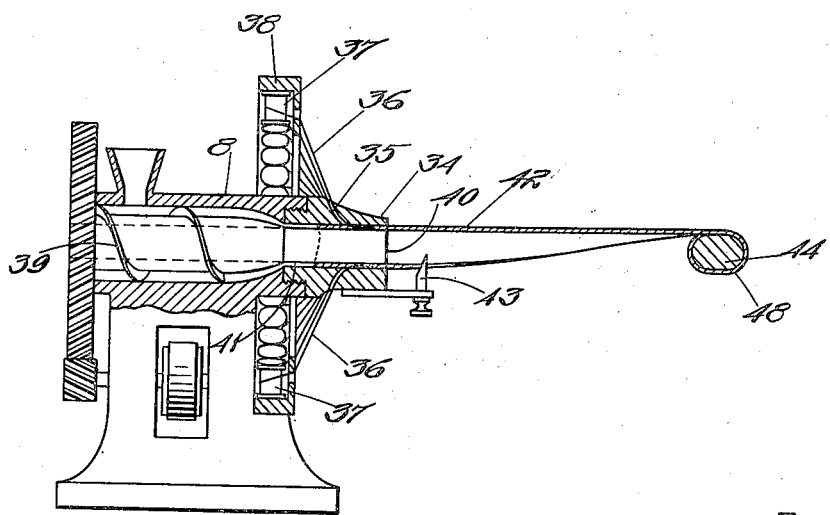
Fig. 5 is a section of the tube forming mechanism taken on line 5—5 of Fig. 4.

In Figs. 4 and 5, there is shown a slightly modified mechanism for producing the strip of sheet stock shown in Figs. 1 and 2 and for practising the method of embodying my invention in slightly modified form. At 8 is shown a tube forming machine having a nozzle 34 through apertures 35 in which are fed cords 36 from spools 37 mounted on the frame 38. At 39 is shown the stuffing screw by means of which the frictioning material is brought into forcible contact with the cords 36. At 40 is shown a stationary mandrel or plug forming one wall of the tubular passage 41 through which the frictioning material is fed. The tube 42 emerges and is split lengthwise by a stationary knife 43 which severs the frictioning material between two of the cords. This tube 42 is then spread and rewound on a mandrel 44 placed at an angle of about 45° with the axis of the tube forming machine 8. This mandrel has a spiral groove 45 therein and this coöperates with a pin 46 in a collar 47. The mandrel 44 is pushed through the collar by a carrier 55 similar to that described in connection with Fig. 3 and the pin 46 and groove 45 cause it to rotate as it advances. As the mandrel 44 goes through the machine it winds the strip 42 upon itself in a spiral form as shown in Fig. 4 and forms a new tube 48 in which the cords are spirally arranged. This tube is then cut or slit at an angle of 45° with the cords. In this case the line of slit is parallel with the axis of the mandrel. At 49 is shown a knife for this purpose. After being cut the material is opened out and wound on a roll 51. As will be understood by those skilled in the art, a strip of muslin 52 is wound between the adjacent layers of the sheet material as it comes off the mandrel 44.

I have not claimed the machine described herein as the same forms the subject matter of another application.

In the finished material the cords lie parallel to each other and are held together by and embedded in the vulcanizable material. Since the cords are not interwoven with each other or with any warp threads, they lie flat and when built into the tire are not displaced or moved with relation to each other and to the vulcanizable material. Each cord may also be subjected to a uniform strain throughout its length and there are no friction points or points of unusual strain as is necessarily the case where one cord crosses another cord or thread as in a woven fabric.

In the foregoing specification and in the claims, I have used the expression vulcanizable material to include any compound of rubber or allied gums which can be subsequently cured in the manner well understood by those skilled in the art, and I intend to include rubber and allied gums in solution although as previously explained I prefer to employ undissolved rubber in its normal dry state. By the expression "on the bias" I intend to include any diagonal arrangement of the cords in the strip without limiting myself to any particular angle although the cords will ordinarily be placed at an angle of 45°. Neither do I limit myself to the particular embodiments of my invention described herein since I believe my invention to be of a basic character and therefore I claim the same broadly.

What I claim is:

1. The method of making sheet stock for pneumatic tires which consists in forming frictioned cord into a tube by laying the cords parallel with the axis of the tube and then cutting the tube to convert it into a strip of flat material.

2. The method of making sheet stock for pneumatic tires which consists in forming the cords into a tube by laying the cords parallel with the axis of the tube, and simultaneously therewith coating the cords with frictioning material, and then cutting the tube to convert it into a strip of flat material.

3. The method of making sheet stock for pneumatic tires which consists in forming the cords into a tube with the cords lying parallel with the axis of the tube, said cords being coated with frictioning material, and held together thereby, and then cutting the tube along a spiral line diagonally of the said cords, to convert the tube into a strip of flat material in which the cords are on the bias.

4. The method of making sheet stock for pneumatic tires which consists in passing cords through a tube forming nozzle to form a tube in which the cords lie parallel with the axis of the tube and as said cords pass through said nozzle coating said cords with vulcanizable material by which they are held together in tube form, and then cutting the tube to convert it into a strip of flat material.

In testimony whereof I affix my signature.

JOSEPH B. BRENNAN.